United States Patent [19]
Miyakawa et al.

[11] Patent Number: 5,095,368
[45] Date of Patent: Mar. 10, 1992

[54] DEFECT-COLLECTING IMAGE INPUT APPARATUS WITH IMAGE SENSOR

[75] Inventors: Tadashi Miyakawa, Kaisei; Kunio Iba, Tama, both of Japan

[73] Assignee: Fuji Photo Film Co., Ltd., Kanagawa, Japan

[21] Appl. No.: 702,431

[22] Filed: May 16, 1991

Related U.S. Application Data

[63] Continuation of Ser. No. 344,792, Apr. 28, 1989, abandoned.

[30] Foreign Application Priority Data

May 10, 1988 [JP] Japan ................. 63-113319

[51] Int. Cl.$^5$ .................................. H04N 3/14
[52] U.S. Cl. ...................... 358/213.17; 358/209; 358/213.13
[58] Field of Search .......... 358/209, 213.15, 213.17, 358/406, 482, 483

[56] References Cited

U.S. PATENT DOCUMENTS

| | | | |
|---|---|---|---|
| 4,179,711 | 12/1979 | Nagumo | 358/213.17 |
| 4,524,390 | 6/1985 | Lemke | 358/209 |
| 4,535,359 | 8/1985 | Fearnside | 358/213.17 |
| 4,567,525 | 1/1986 | Endo et al. | 358/213.15 |
| 4,739,495 | 4/1988 | Levine | 358/213.15 |
| 4,920,428 | 4/1990 | Lin et al. | 358/213.17 |
| 5,047,863 | 9/1991 | Pape et al. | 358/213.17 |

FOREIGN PATENT DOCUMENTS 2126826  3/1984  United Kingdom ............... 358/209

*Primary Examiner*—Edward L. Coles, Sr.
*Assistant Examiner*—Jill Jackson
*Attorney, Agent, or Firm*—Sughrue, Mion, Zinn Macpeak & Seas

[57] ABSTRACT

According to the present invention, the image input apparatus is adapted to sample the image signal read by the linear image sensor by means of the sampling means in order to output image data. The object of the present invention is accomplished by a provision of image input apparatus comprising a memory provided with positional data previously stored therein of defective elements of the image sensor corresponding to respective picture elements of a linear image sensor and a sampling control means for preventing, when the difference value between the adjacent pictures of an image signal is less than the predetermined one, a sampling means from carrying out sampling at the present picture element corresponding to said defective element of the image sensor in accordance with said memory and outputting image data of the sampling signal of the adjacent previous picture element, and for allowing sampling, when said difference value is more than the predetermined value, at the present picture element according to said defective element of the image sensor in compliance with said memory and outputting the image data of the sampling signal of the adjacent present picture elements as they are.

7 Claims, 5 Drawing Sheets

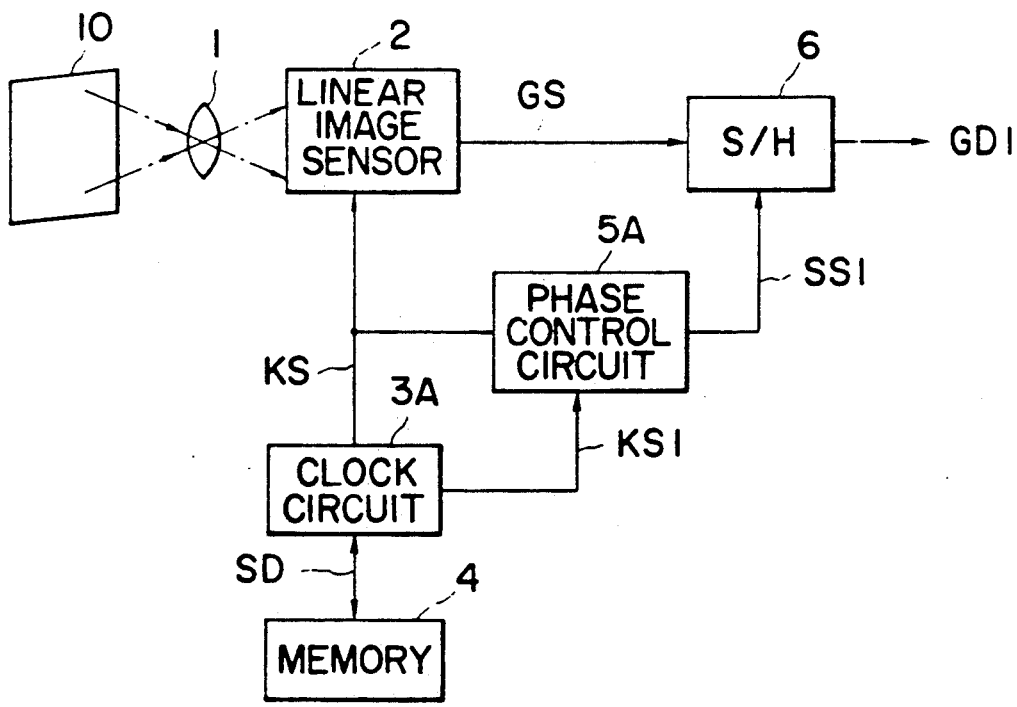
F I G. 2

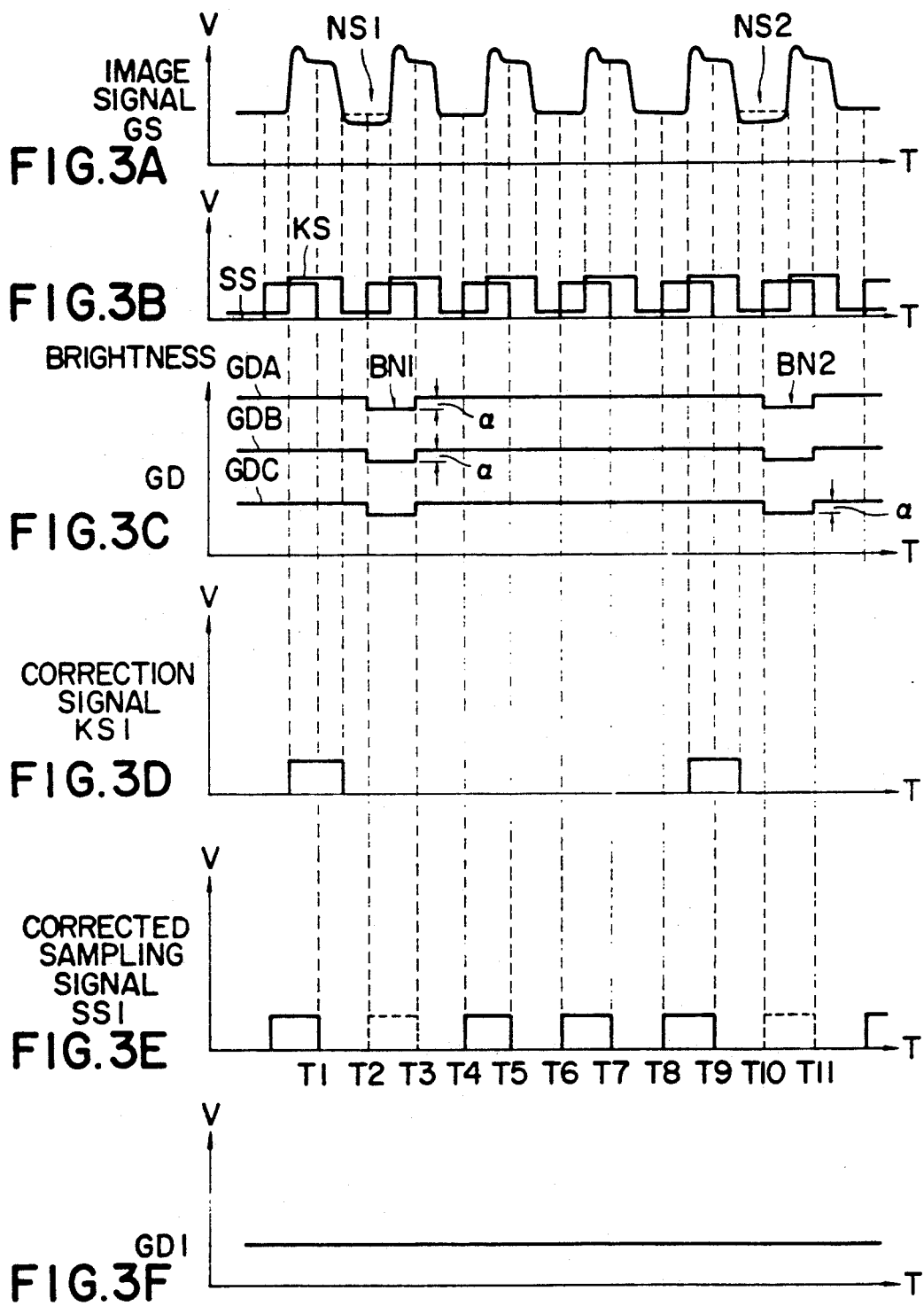

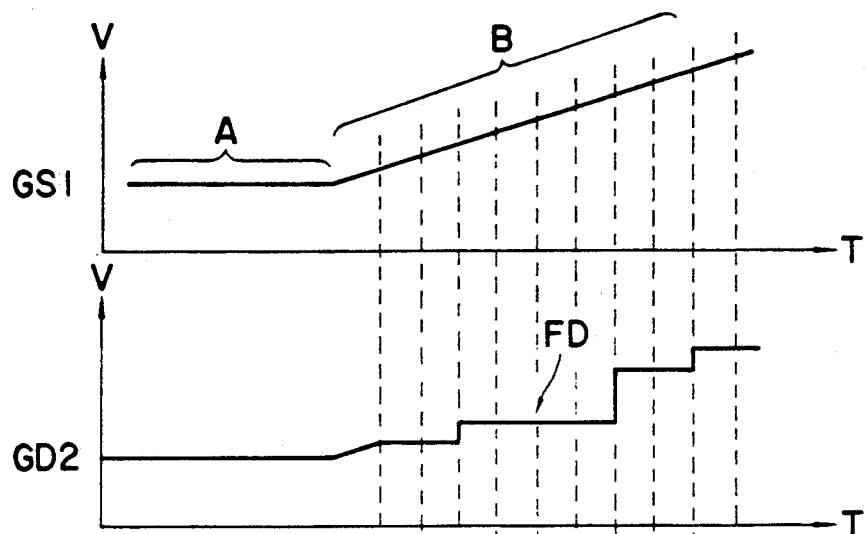
FIG.4A GS1
FIG.4B GD2
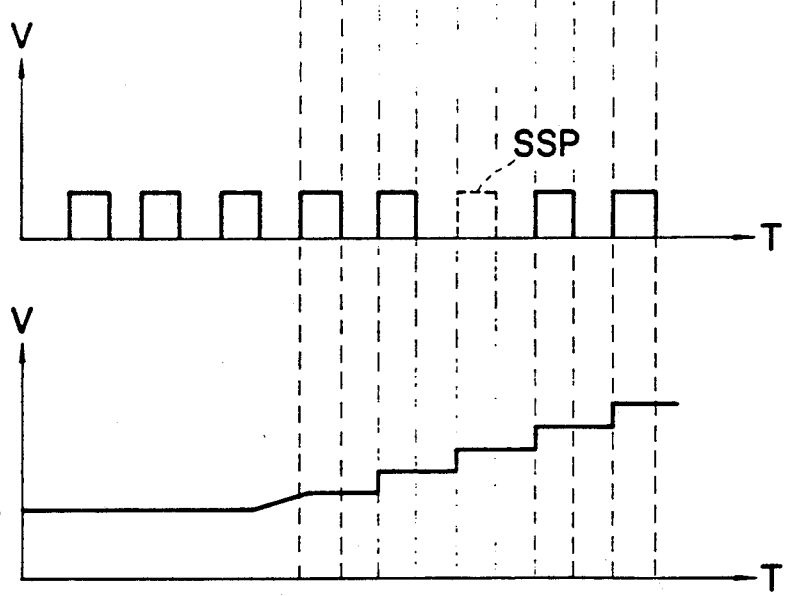
FIG.4C SS1
FIG.4D GD3

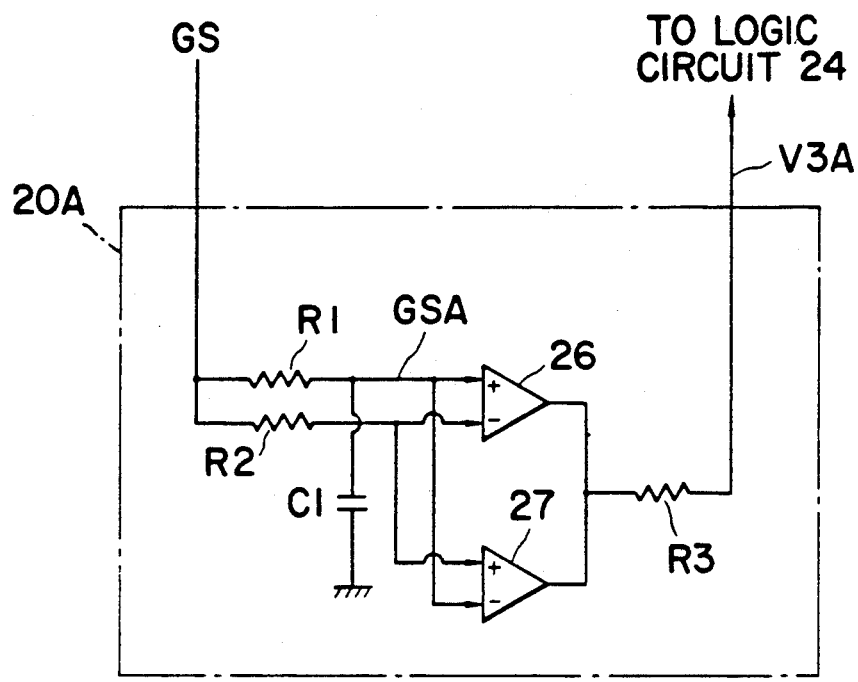
FIG. 6
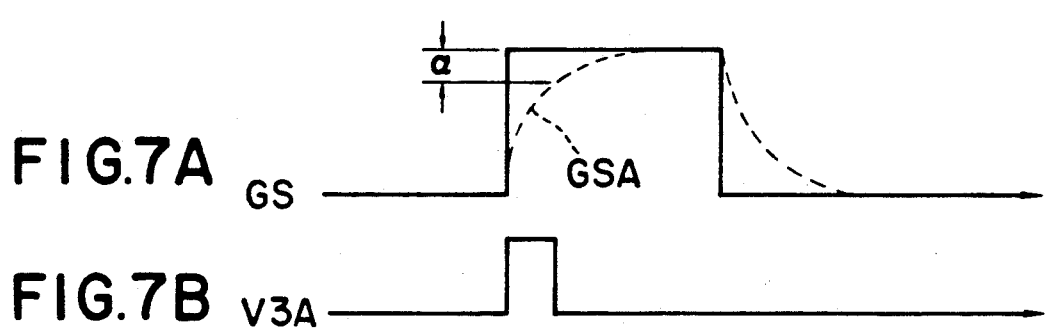
FIG. 7A GS
FIG. 7B V3A

DEFECT-COLLECTING IMAGE INPUT APPARATUS WITH IMAGE SENSOR

BACKGROUND OF THE INVENTION

This is a continuation of Ser. No. 07/344,792 filed Apr. 28, 1989, now abandoned.

This invention relates to an image input apparatus adapted to delete defective elements of an image sensor which are constantly generated from the picture element of the linear image sensor, such as a CCD (Charge Coupled Device) and the like, and outputs high quality image data.

FIG. 1 shows a block diagram of a conventional and general image input apparatus.

In the conventional image input apparatus, an image 10 of an original and the like is optically read by a linear image sensor 2, such as a CCD and the like. A clock signal KS as shown in FIG. 3B is inputted from a clock circuit 3 to the linear image sensor 2. An image signal GS as shown in FIG. 3A, which is synchronized with the clock signal KS, is outputted from the linear image sensor 2. Also, the clock signal KS is inputted from the linear image sensor 2 to the phase control circuit 5, and a sampling signal SS, which shifted from the clock signal KS by a predetermined value as shown in FIG. 3B, is inputted to a sample hold circuit 6. The sample hold circuit 6 samples and holds a signal component corresponding to respective elements of the image signal GS. The sample hold circuit 6 outputs, as image data GD, a hold value corresponding to each picture element.

It is noted that the number of the picture elements in the linear image sensor 2 is enormous. There is wide variation in quality of the linear image sensor 2 and, as a result, the picture element may in quality and output for various different signals. Even though the linear image sensor 2 reads an image 10 having a uniform density the linear image sensor 2 outputs image signal GS containing defective elements of image sensors NS1 and NS2 as shown in FIG. 3A. When image signal GS is inputted to the sample hold circuit 6, image data GD having noises BN1 and BN2, as shown in FIG. 3C, is outputted. In this case, the value of these defective elements of image sensor NS1 and NS2 is always constant irrespective of the density (brightness) of the image 10, so that the difference α between the true value and each value at the respective levels of these noises BN1 and BN2 is constant even though the levels vary vertically as shown by GDA, GDB and GDC in FIG. 3C.

When an image is reproduced on the basis of the image data GD output from the sample hold circuit 6, in the manner taught by the prior art, and displayed in a display device, the linear image sensor 2 disadvantageously generates the defective elements of the image sensor 2 through particular picture elements in the sensor. As a result irregularities in the shape of vertical stripes appear on the displayed image because the particular or same picture elements of the linear image sensor 2 constantly generates defective elements the.

In addition, since that the level difference α or error which is constant irrespective of the density (brightness) of the image 10 is outputted, it is difficult to delete noises BN1 and BN2 contained in the image data GD by means of a conventional correction device for correcting the sensitivity (or brightness).

SUMMARY OF THE INVENTION

Considering the problem mentioned above, the image input apparatus has been invented to solve the problem. Accordingly, it is the object of the present invention to provide the image input apparatus adapted to delete any defective elements of the image sensor generated from the particular picture elements of the linear image sensor so as to obtain image data of high quality.

According to one aspect of this invention, for achieving the objects described above, the image input apparatus comprises a memory provided with positional data previously stored therein of a defective element corresponding to respective picture elements of a linear image sensor and a sampling control means. When the difference value between the adjacent picture elements of an image signal is constantly measured and the difference value is less than the predetermined value, a sampling means is prevented from sampling the present picture element corresponding to the defective element of the image sensor in accordance with the memory. In place of the sampling of the present picture element, image data of the sampling signal of the adjacent previous picture elements is output instead when the difference value is more than the predetermined one, at the present picture element corresponding to the defective element of image sensor in accordance with the The nature, principle and utility of the invention will become more apparent from the following detailed detailed description when read in conjunction with the accompanying drawings.

BRIEF DESCRIPTION OF THE DRAWINGS

In the accompanying drawings:

FIG. 2 is a block diagram of the image input apparatus obtained by improving the conventional apparatus;

FIGS. 3A to 3F are time charts showing examples of the signal waveshapes;

FIGS. 4A to 4D respectively shows example of intensities of the image signals generated in the image input apparatus according to the present invention;

FIG. 6 shows a circuit of another example of the difference detection control circuit; and FIGS. 7A and 7B respectively show an explanatory view for a discriminating method.

PREFERRED EMBODIMENTS OF THE INVENTION

Figure 1:
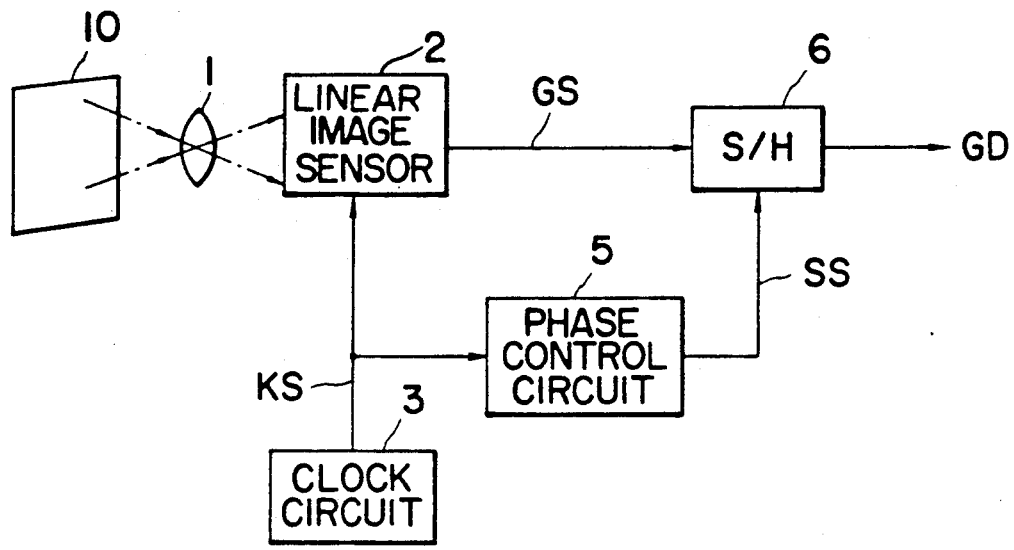
FIG. 1 is a block diagram of the conventional and general image input apparatus.

FIG. 2 shows a block diagram of the improved image input apparatus, in which apparatus the problem of the conventional one shown in FIG. 1 is eliminated. In FIGS. 1 and 2 the same and similar reference numerals are applied to the same and similar parts.

In the image input apparatus shown in FIG. 2, memory 4 added to the conventional apparatus shown in FIG. 1, for measuring and storing the positional data SD of the defective elements of image sensor corresponding to respective positions of picture elements of the linear image sensor 2. The clock circuit 3A is adapted to output a correction signal KS1, which is based on the positional data SD stored in the memory 4. The phase control circuit 5A generates a sampling signal SS1 which is corrected on the basis of the correction signal KS1 and inputted into the sample hold circuit 6.

The memory 4 stores the positional data SD of the picture elements of defective elements of the image sensor. The positional data SD is obtained by a measurement of the picture element data by means of the linear image sensor 2.

The operation of the image input apparatus is below with reference to the time chart of FIGS. 3A to 3F. Similar to the operation of the prior art shown in FIG. 1, the image 10 is read by the linear image sensor 2 through an optical system 1, and an image signal GS is outputted from the linear image sensor 2 and inputted to the sample hold circuit 6. By the time, the memory 4 has outputted positional data SD showing the defective elements of image sensor NS1 and NS2 and the positional data SD has been inputted into the clock circuit 34, the correction signals KS1 at the positions of the picture elements corresponding to these defective elements of image sensor NS1 and NS2 as shown in FIG. 3D are inputted to the phase control circuit 5A. When the correction signals KS1 are inputted to the phase control circuit 5A, the circuit 5A does not output a clock signal KS of the particular timing. Thus, the corrected sampling signals SS1 shown in FIG. 3E are inputted to the sample hold circuit 6. In detail, contrary to the correction signals KS1 shown in FIG. 3D corresponding to the defective elements of image sensors NS1 and NS2 in FIG. 3A, the corrected sampling signals SS1 shown in FIG. 3E are inputted into the sample hold circuit 6. Thus, the image signal GS of the defective elements of image sensor NS1 and NS2 is prevented from being sampled and the held signal as it is after a sampling of the data of the previous picture elements is outputted. Consequently, the defective elements of image sensor are prevented from affecting the output signals. The image data GD1 outputted from the sample hold circuit 6 has a uniform shape which does not have the defected elements of image sensor BN1 and BN2 as shown in FIG. 3F, resulting in a display image of high quality.

However, when the image signal GS1, having a slope as shown in FIG. 4A, is inputted into the image input apparatus, the sloped portion of the image signal GS1 is not sampled at the pulse SSP of the corrected sampling signal SS1 corresponding to the defective elements of the image sensor as shown in FIG. 4C the sample hold signal of the previous picture element is outputted as the image data. As a result, the image data GD2 has a large step at the position FD corresponding to the defective elements of the image sensor, as shown in FIG. 4B, which is disadvantageous.

In order to enable the image input apparatus to handle the image signal GS1 having both a sloped portion "B" and a uniform flat portion "A", it is necessary to carry out an ordinal sampling control on the flat image signal A shown in FIG. 3A and a particular sampling control on the sloped image signal portion B shown in FIG. 4A so as to prevent a large stepped portion from occurring in the image data GD2.

Figure 5:
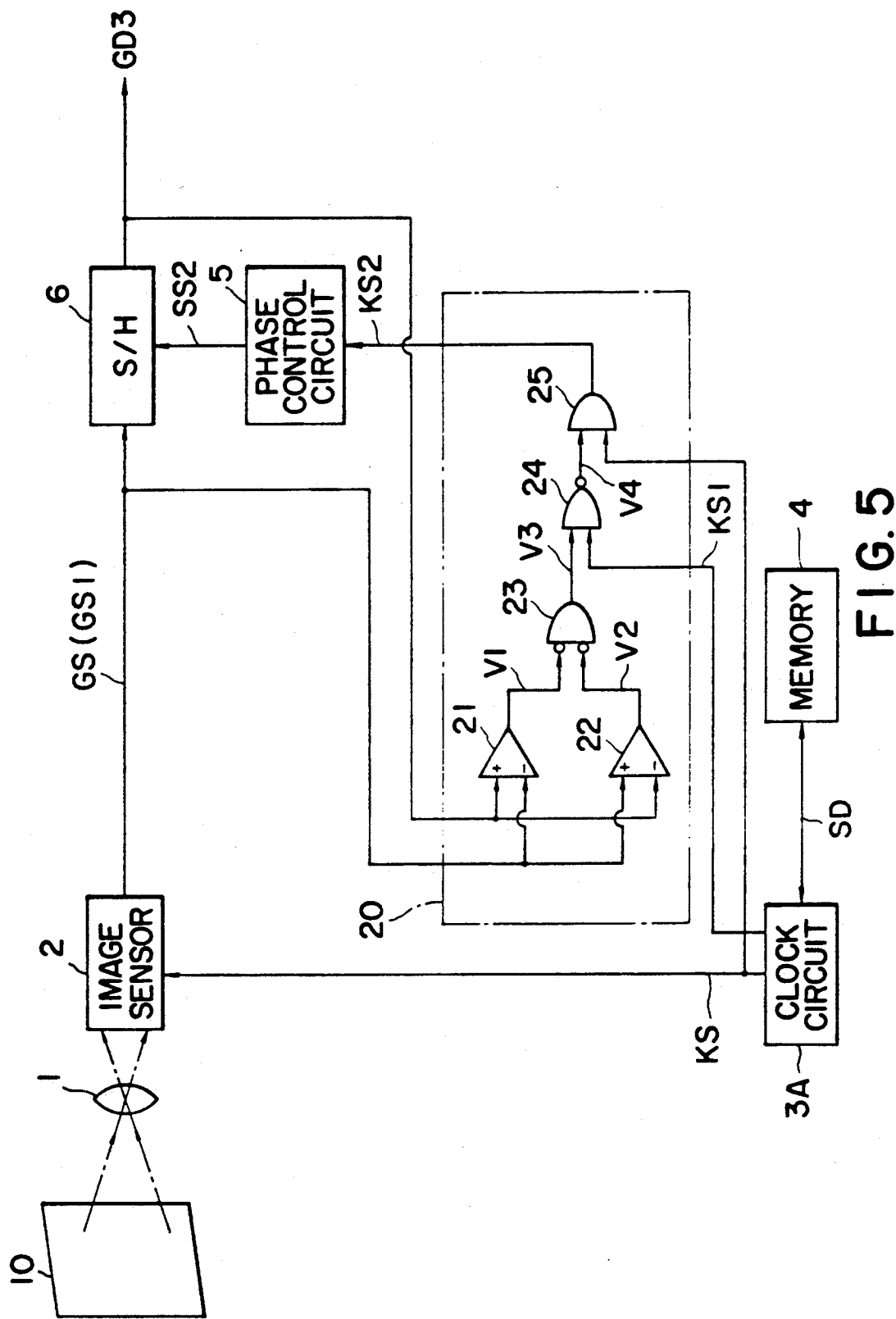
FIG. 5 is a block diagram of the image input apparatus according to the present invention.

FIG. 5 shows an example of the block diagram of the image input apparatus according to the present invention satisfying the above requirement, in which the same reference numerals of FIG. 2 are used to correspond to the same parts in FIG. 5.

The image input apparatus shown in FIG. 5 of the present invention is created by adding a difference detection control circuit 20 to the image input apparatus shown in FIG. 2. The difference detection control circuit 20 constantly measures or detects a difference in signal intensities of adjacent picture elements of the image signal. When the difference is less than the predetermined one, the difference detection control circuit 20 inputs a correction signal KS2 into the phase control circuit 5 thereby preventing a sampling of the positional data SD stored in the memory 4. When the difference is more than the predetermined one, the difference detection control circuit 20 inputs a clock signal KS from the clock circuit 3A in place of the correction signal KS2.

The difference detection control circuit 20 receives an image signal GS (GS1) of an analog output from an input/output side of the sample hold circuit 6 and an image data GD3 held in the sample hold circuit 6. The difference in signal levels of the image signal GS and the image data GD3 is detected by comparator 21 (negative direction) and comparator 22 (positive direction) of the difference detection control circuit 20. The input terminals of these comparators 21 and 22 are connected in reverse. When the image signal GS (GS1) and the image data GDS are inputted into the comparators 21 and 22, binary signals V1 and V2, respectively generated in the comparators 21 and 22, are inputted into a logic circuit (OR) 23. Thereby outputting another binary signal V3 according to the condition of a following table 1. That is, when the difference between the signals from the input/output side of the sample hold circuit 6 is small, the comparators 21 and 22 output "L". Only when the difference in a negative direction becomes more than the predetermined value does the output V1 of the comparator 21 becomes "H". When the difference in a positive direction becomes more than the predetermined value, the output V2 of the comparator 22 becomes "H".

TABLE 1

| image signal | V1 | V2 | V3 |
|---|---|---|---|
| GS1 | H | L | L |
| GS1 | L | H | L |
| → GS | L | L | H |

The correction signal KS1 outputted from the clock circuit 3A on the basis of the binary signal V3, which is outputted according to the condition shown in the table 1 and the positional data SD of the memory 4, is inputted to a logic circuit (NAND) 24. Thus logic circuit (NAND) 24 outputs a binary signal V4 according to the condition of table 2. That is, when the binary signal V3 is "L", a sampling must be carried out irrespective of the output of the correction signal KS1, so that the output V4 of the logic circuit 24 becomes "H". When the binary signal V3 is "H", sampling must be stopped according to correction signal KS1. Consequently, when the correction signal KS1 is "L", "H" is outputted from the logic circuit 24. When the correction signal KS1 is "H", the output of of V4 is "L".

TABLE 2

| V3 | KS1 | V4 |
|---|---|---|
| L | H | H |
| H | L | H |
| L | L | H |
| H | H | L |

As described above, the binary signal V4 generated from the logic circuit 24 and the clock signal KS, outputted from the clock circuit 3A, are inputted to the logic circuit (AND) 25. When the binary signal V4 is "H", the clock signal KS is outputted as a correction signal KS2. When the correction signal KS1 becomes of "H" and the binary signal V4 becomes of "L", a correction signal KS2 is outputted stopping the clock signal KS and sampling. The relation between the two values of the difference detection control circuit 20 and the sampling is shown in the following table 3.

TABLE 3

| image signal | V1 | V2 | V3 | KS1 | V4 | sampling |
|---|---|---|---|---|---|---|
| GS1 | H | L | L | H | H | done |
| GS1 | L | H | L | H | H | done |
| → GS | L | L | H | H | L | stopped |

When an image signal GS1 shown in FIG. 4A is inputted into the difference detection control circuit 20, a sampling control is carried out at the flat portion A of the image signal GS1 as explained with reference to FIG. 2. As a result, any effect of the defective elements of image sensor shown in FIG. 3 can be delected as is apparent from Table 3. When the gradient of the slope portion B of the image signal GS1 has a positive value larger than the predetermined value, the output V2 of the comparator 22 becomes of "H". On the contrary, as the gradient has a negative value larger than the predetermined value, the output V1 of the comparator 21 becomes of "H", making the output V3 of the logic circuit 23 "L" and cancelling the input of the correction signal KS1. Consequently, a sampling is carried out at any defective elements of the image sensor and it is possible to delete an effect signal change due to a stoppage of a sampling. As a result, the image signal GS (GS1) becomes the image data GD3 of high quality having no effect of the noises BN1 and BN2 as shown in FIG. 4D.

The difference detection control circuit 20 determines the slope degree from a difference between the image signal GS and the image data GD3. However, it is possible to directly determine the slope degree according to the change value of the image signal GS (GS1) and an integration signal, because the integration signal has a time delay from the input signal where the time delay corresponds to a change rate of the input signal.

FIG. 6 shows an example of the difference detection control circuit 20A using the principle described above, in which circuit the image signal GS is inputted to comparators 26 and 27 through resistors R1 and R2. An output of the resistor R1 is grounded through a capacitor C1. As a result, an integration circuit is formed. Inputs to he comparators 26 and 27 are connected in reverse to each other. One of these comparators detects positive elements of the image sensor and it gradients. When a difference between inputs to respective terminals of the comparators 26 and 27 becomes larger than the predetermined value a, a binary signal is outputted from the comparators 26 and 27 and a detection signal V3A of the binary signal is inputted to a logic circuit 24, as shown in FIG. 5, through a resistor R3.

When a step-shaped image signal GS, as shown in FIG. 7A, is inputted to the system of FIG. 5, the image signal GS becomes an integration signal GSA, shown by the broken line. The image signal GS and the integration signal GSA are inputted into the comparators 26 and 27. When the difference of the image signal GS from the integration signal GSA is larger than the predetermined value a, a binary signal V3A shown in FIG. 7B is outputted. FIGS. 7A and 7B show respectively the change from the image signal GS to the binary signal V3A also, there is a case in which the image signal GS changes continuously.

According to the image input apparatus of the present invention, any effect of the defective element of image sensor of picture element in the linear image sensor, which effect has been difficult to delete, can be completely removed. Additionally the output signal is not affected by the sampling if an image signal with a slope is inputted to the image input apparatus, so that high quality image data can be advantageously obtained. In addition, the construction of the image input apparatus is simple and the manufacturing cost of the apparatus is low.

It should be understood that many modifications and adaptations of the invention will become apparent to those skilled in the art and it is intended to encompass such obvious modifications and changes in the scope of the claims appended hereto.

What is claimed is:

1. An image input apparatus comprising:
   a linear image sensor having a plurality of picture elements, each element having a position adjacent to at least one other element and some of said elements being defective, said sensor outputting a linear image signal corresponding to an image sensed by each of said picture elements;
   a memory having positional data previously stored therein identifying the relative location of each of said defective elements;
   a sampling means for sampling a portion of said image signal corresponding to a present picture element and holding said sample; and
   a sampling control means for controlling said sampling means so that said sampling means outputs said sample of said present picture element when said present picture element is not defective and outputs the held sample of the previously stored picture element which corresponds to a picture element adjacent to said present picture element where said present picture element is defective, said sampling control means determining that said present picture element is defective in accordance with said positional data stored in said memory means.

2. An image input apparatus as claimed in claim 1, wherein said sampling control means comprises a sample hold circuit for sampling and holding said portion of the image signal from said image sensor, a clock circuit for outputting a first correction signal corresponding to said positional data stored in said memory, and a phase control circuit for transmitting a sampling signal, according to said first correction signal, to said sample hold circuit, wherein said first correction signal identifies said defective picture elements from said positional data so that said sampling signal causes said sampling means to output the held sample of said previously sampled picture element when said present picture element is defective.

3. An image input apparatus as claimed in claim 2, further comprising:
   a slope detection means for detecting a slope of the intensity of said image signal;
   wherein for a first condition when the magnitude of said detected slope is less than a predetermined slope value, said sampling control means causes said sampling means to not sample said defective element and output the held sample of said previously sampled picture element; and for a second condition when the magnitude of said detected slope is greater than said predetermined slope value, said sampling control means causes said sampling means to sample said defective picture elements.

4. An image input apparatus as claimed in claim 1, further comprising:
a slope detection means for detecting a slope of the intensity of said image signal;
wherein for a first condition when the magnitude of said detected slope is less than a predetermined slope value, said sampling control means causes said sampling means to not sample said defective element and output the held sample of said previously sampled picture element; and
for a second condition when the magnitude of said detected slope is greater than said predetermined slope value, said sampling control means causes said sampling means to sample said defective picture elements.

5. An image input apparatus as claimed in claim 4, wherein said slope detection means comprises a difference detection control circuit for constantly measuring or detecting a difference in signal intensity between adjacent picture elements of said image signal, wherein said first condition is determined when said detected difference is less than a predetermined difference value so that said sampling means does not sample said defective elements and said second condition is determined when said detected difference is more than the predetermined difference value so that said sampling means samples said defective elements in response to a clock signal from a clock circuit.

6. An image input apparatus as claimed in claim 5, wherein said difference detection control circuit further comprises:
two comparators each of which receives both said image signal and sampled data output from said sample hold circuit and compares the image signal with said sampled data; and
logic circuits for receiving the clock signal and a first correction signal from said clock circuit and for receiving compared data from said two comparators, wherein a first correction signal identifies said defective picture elements from said positional data, and wherein said compared data corresponds to the comparison of said image signal and said sampled data output from said sample hold circuit by said comparators.

7. An image input apparatus as claimed in claim 3, wherein said difference detection control circuit further comprises: first and second comparators which both receive the image signal through a plurality of resistors, said second comparator being connected such that negative and positive inputs thereof are connected in reverse to said first comparator; a capacitor which is connected between one output of said plurality of resistors and grouns; and logic circuits which receive outputs of said comparators through a resistor, the clock signal from said clock circuit and the first correction signal.

* * * * *